(12) United States Patent
Cheng et al.

(10) Patent No.: US 10,142,651 B1
(45) Date of Patent: Nov. 27, 2018

(54) FRAME RATE CONVERSION WITH PARTIAL MOTION VECTOR

(71) Applicant: PIXELWORKS, INC., Portland, OR (US)

(72) Inventors: Guohua Cheng, Shanghai (CN); Yue Ma, Pleasanton, CA (US); Neil Woodall, Newport Beach, CA (US); Bob Zhang, Santa Clara, CA (US)

(73) Assignee: PIXELWORKS, INC., Portland, OR (US)

( * ) Notice: Subject to any disclaimer, the term of this patent is extended or adjusted under 35 U.S.C. 154(b) by 210 days.

(21) Appl. No.: 14/567,064

(22) Filed: Dec. 11, 2014

(51) Int. Cl.
*H04N 19/513* (2014.01)
*H04N 19/46* (2014.01)

(52) U.S. Cl.
CPC ........... *H04N 19/521* (2014.11); *H04N 19/46* (2014.11)

(58) Field of Classification Search
CPC .............................. H04N 19/46; H04N 19/521
See application file for complete search history.

(56) References Cited

U.S. PATENT DOCUMENTS

| 9,131,202 B1* | 9/2015 | Espeset | H04N 9/8045 |
| 2002/0094029 A1* | 7/2002 | Apostolopoulos | H04N 21/25808 375/240.16 |
| 2007/0019866 A1* | 1/2007 | Ayres, Jr. | H04N 7/17318 382/232 |
| 2007/0067480 A1* | 3/2007 | Beek | H04L 29/06027 709/231 |
| 2008/0215671 A1* | 9/2008 | Lu | G06F 3/1415 709/203 |
| 2009/0165085 A1* | 6/2009 | Naka | G06F 21/32 726/2 |
| 2009/0193067 A1* | 7/2009 | Mathew | G06T 11/20 708/809 |
| 2014/0032775 A1* | 1/2014 | Abiezzi | H04N 19/51 709/231 |
| 2015/0271530 A1* | 9/2015 | Xie | H04N 19/117 375/240.16 |

* cited by examiner

*Primary Examiner* — Christopher G Findley
(74) *Attorney, Agent, or Firm* — Miller Nash Graham & Dunn LLP

(57) ABSTRACT

A system can include a memory and a motion vector calculator (MVC) configured to receive a block from the memory, the MVC including an MVC core configured to generate a partial motion vector (MV) for the block, a halo reduction block configured to perform halo reduction on the partial MV, and an MV post-processing block configured to smooth the partial MV and output the smoothed partial MV.

8 Claims, 5 Drawing Sheets

US 10,142,651 B1

FRAME RATE CONVERSION WITH PARTIAL MOTION VECTOR

TECHNICAL FIELD

The disclosed technology pertains to graphics processing, and more particularly to techniques pertaining to frame rate conversion using motion vectors.

BACKGROUND

Normal movie footage is typically shot at 24 frames per second (fps), and video sources on the Internet are generally transmitted at a low or even variable frame rate. In order to show low-frame-rate sources on a television or mobile device, a frame rate conversion must take place.

Therefore, a Frame Rate Converter (FRC) Integrated Circuit (IC) which interpolates new frames is widely used in televisions and on certain cell phones, especially in situations where the refresh rate of the display is 120 fps or higher. Limited by hardware algorithms and, in the case of mobile devices, power, FRC ICs will disadvantageously introduce artifacts such as halo or break up.

Accordingly, there remains a need for improved motion vector solutions for frame rate conversion.

DETAILED DESCRIPTION

Embodiments of the disclosed technology generally include a partial motion vector (MV)-based solution to improve the performance of lower cost frame rate converters (FRCs). The use of partial MVs may advantageously provide hints to FRC integrated circuits (ICs) and/or replace certain MVs calculated by an FRC IC. Further, the partial MV may be packed with compressed video in a way that is compatible with televisions (TVs) and other devices that are unable to use the additional information.

Figure 1:
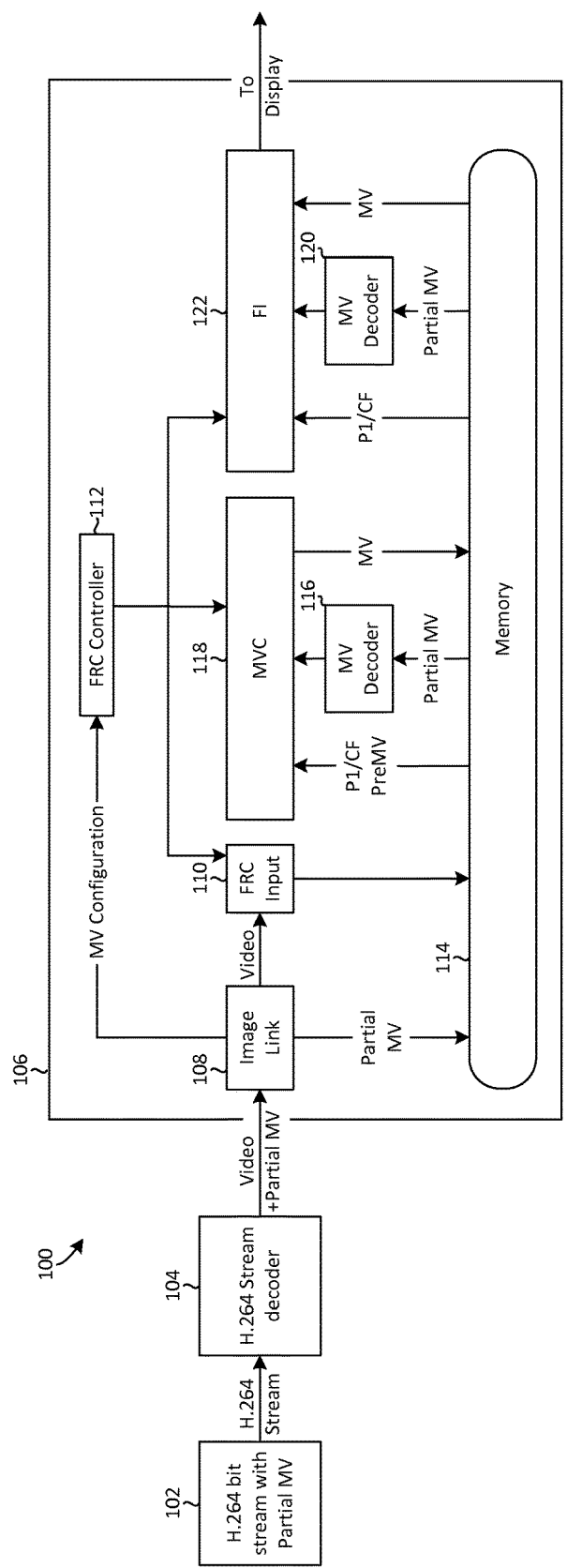
FIG. 1 illustrates an example of a partial MV system in accordance with certain embodiments of the disclosed technology.

FIG. 1 illustrates an example of a partial MV system 100 in accordance with certain embodiments of the disclosed technology. In the example, the partial MV system 100 includes a server 102, an application processor 104, and an FRC IC (client) 106. The server 102 is generally responsible for generating the H.264, or other video compression standard, stream in its native frequency (e.g., 24 Hz or 30 Hz or some other frame rate) and inserting the additional MV information. The application processor 104 is generally responsible for splitting the H.264 stream into video and partial MV data and transferring this data to the FRC IC 106. The FRC IC 106 may use the partial MV data and generate higher quality video at the desired frame rate.

Figure 2:
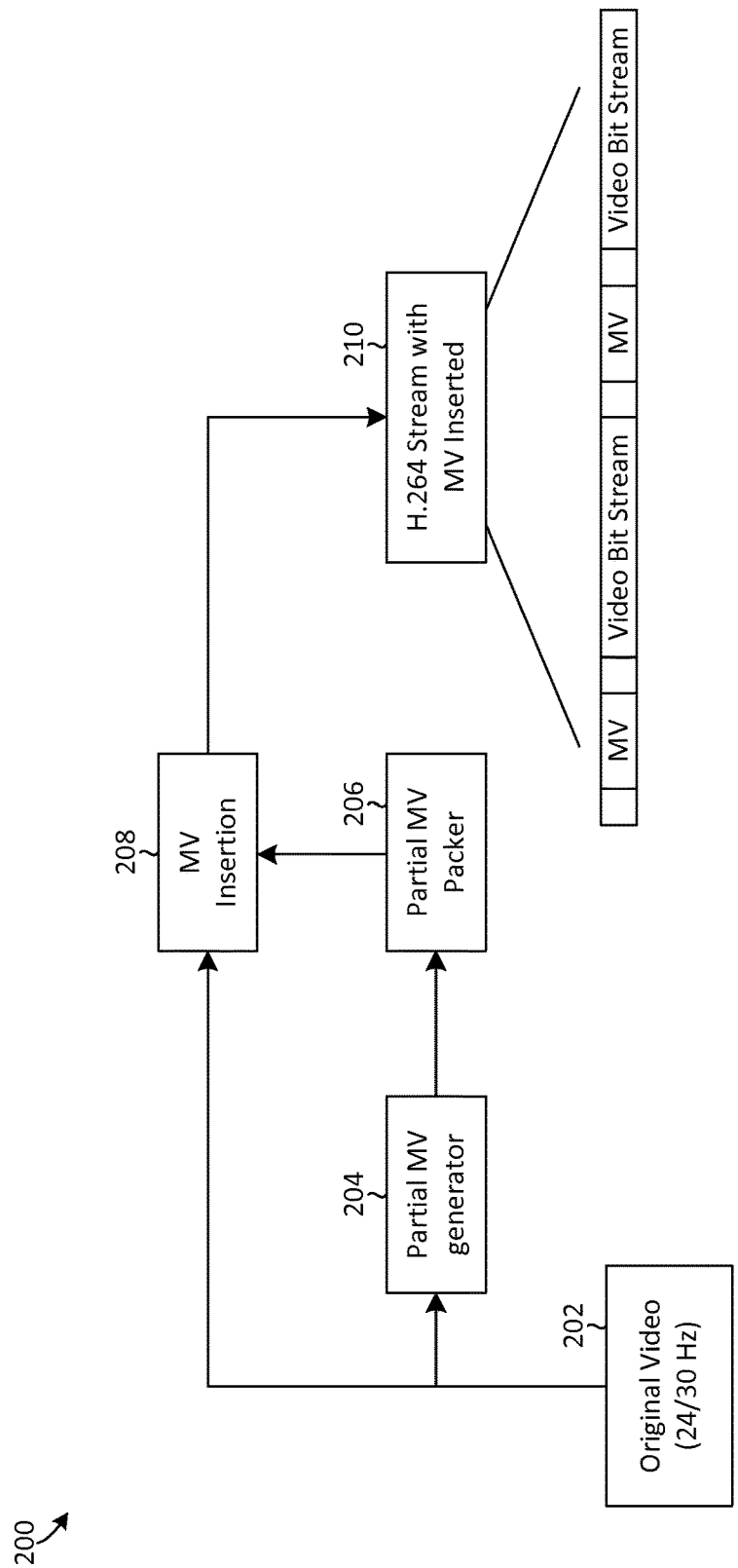
FIG. 2 illustrates an example of H.264 bit stream generation for the partial MV system illustrated by FIG. 1 in accordance with certain embodiments of the disclosed technology.

FIG. 2 illustrates an example of H.264 bit stream generation 200 for the partial MV system 100 illustrated by FIG. 1 in accordance with certain embodiments of the disclosed technology. At the server side, a partial MV generator 204 may receive a partial MV for each block from an original video 202 (e.g., 24 Hz or 30 Hz), and a partial MV packer 206 may perform MV compression to reduce the size of the partial MV. An MV insertion component 208 may insert MV data into an H.264 Supplementary Enhanced Information (SEI) section. In this SEI section, the MV is generally physically aligned with the video frames as can be seen in the H.264 stream with MV inserted 210. Alternatively, the PMV data could be downloaded in parallel. In this case, the PMV data would contain time code, or other information to allow it to be aligned with the video playback.

In certain embodiments, the partial MV generator 204 is more tightly integrated with the H.264 encoder. Because H.264 encoders are typically optimized for data compression, not all of the motion vectors represent the true motion of the objects. Therefore, in general, it is not possible to use such MVs in FRC. In addition, the highest quality approach generally requires more MVs than is required for H.264 encoding. However, it does have the potential to reduce the bandwidth requirements. In this case, some of the partial MVs may be used as the MVs in the H.264 encoding process and, in such embodiments, the SEI section would usually contain information to indicate which of the H.264 MVs are suitable to use for FRC and the other MV phases required by the FRC IC.

The partial MV data is generally packed into a MV packet at the server side. The MV packet typically contains the following information: partial MV phase number of the current frame, size of the MV data, precise interpolation phase, global register packets, and other PQ-related information such as film border, global motion model, global MV, regional foreground MV, regional background MV, and regional brightness compensation value.

The application processor in a mobile device or TV will typically split the MV data and video frames from an H.264 stream and send them to an FRC IC. The MV data may be decoded, processed, and then repacked again to match the actual FRC IC that is being used.

In the example, the FRC IC 106 may extract the MV configuration (e.g., by way of image link 108) and send it to an FRC controller 112. The rest of the MV data may be stored in a memory 114 for later use (e.g., by way of FRC input 110). A motion vector calculator (MVC) 118 may read the partial MV data from the memory 114 (e.g., using MV decoder 116) and overwrite the internally generated MV along with any global/regional information from the server side to improve its three-dimensional (3D) recursive performance. A frame interpolation (FI) component 122 may also use the overwritten MV (e.g., by way of MV decoder 120) for interpolation.

Figure 3:
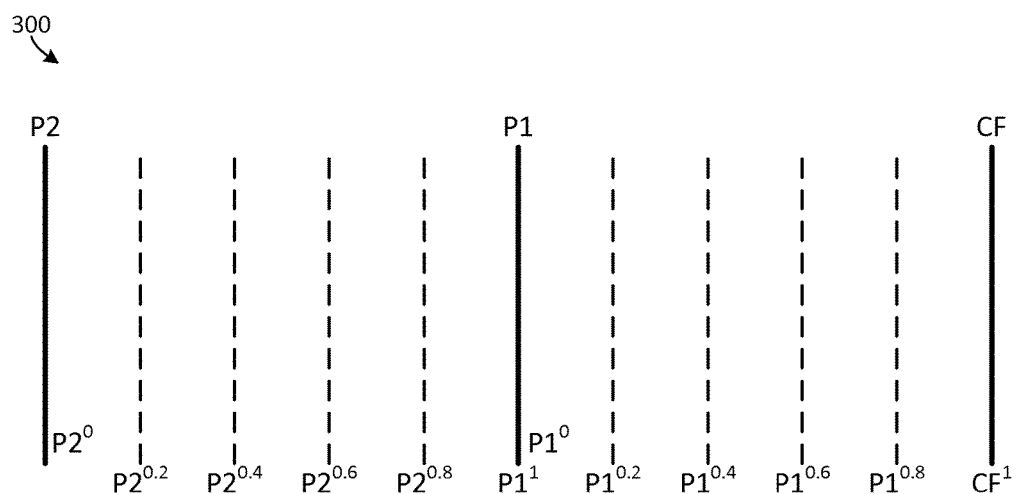
FIG. 3 illustrates an example in which the FRC IC illustrated by FIG. 1 may need to perform motion estimation for each interpolated phase.

FIG. 3 illustrates an example 300 in which the FRC IC 106 illustrated by FIG. 1 may need to perform motion estimation for each interpolated phase. In the example, the input is 24 Hz and the output frame is 120 Hz, and the FRC IC 106 calculates the MV field at phases of 0, 0.2, 0.4, 0.6 and 0.8 between each successive input frame.

To further reduce halo, the FRC IC 106 may additionally calculate a phase 1 MV. Again referring to the example 300 illustrated by FIG. 3, an MV is estimated for each block in CF based on P1 frame and denoted with phase 1 MV field (i.e., $CF^1$). Also in the example, an MV may be estimated for each block in P1 based on CF frame and denoted as a phase 0 MV field (i.e., $P1°$). Indeed, partial MV's may be needed for each of these MVC phases.

Figure 4:
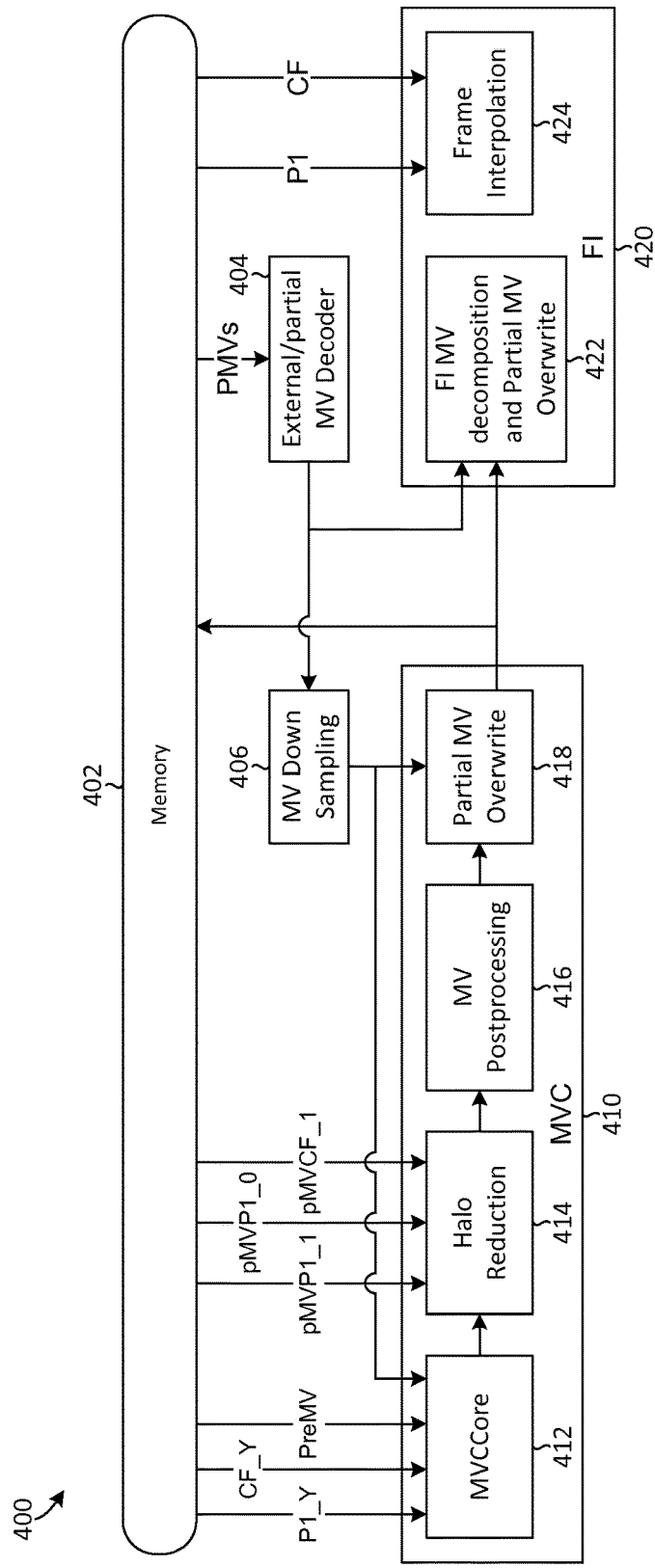
FIG. 4 illustrates an example of a system having a memory, a block-based MV calculation (MVC) block, and a frame interpolation (FI) block in accordance with certain embodiments of the disclosed technology.

FIG. 4 illustrates an example of a system 400 having a memory 402, a block-based MV calculation (MVC) block 410, and a frame interpolation (FI) block 420 in accordance with certain embodiments of the disclosed technology. The output of an FRC IC typically has artifacts such as halo, break-up, and wrong image after scene changes or for small objects. Therefore, partial MVs may be used to improve FRC quality. The system 400 of FIG. 4 illustrates an example of using partial MV to improve FRC.

In the example, the MVC block 410 includes an MVC core 412, which may generate an initial MV field for each block, and a halo reduction component 414, which generally uses 0/1 phase MV to perform occluded region detection and halo reduction (a wrong MV in an occluded region may be corrected to a regional background MV). An MV postprocessing component 416 may be used to smooth the MV field and perform local fallback, e.g., to reduce break-up issue.

The MVC block 410 may generate the following information as part of its output MV and after MV post-processing 416: $MV_x$ (i.e., motion in horizontal direction), $MV_y$ (i.e., motion in vertical direction), $K_{occ}$ i.e., used to denote cover/uncover information), $K_{still}$ (i.e., gain to blending zero MV, generally used to do local fallback), and $SAD_{np}$ (i.e., to denote reliability of the MV).

To reduce the amount of data, only a small percentage of the blocks will typically use partial MV. Furthermore, for each partial MV, not all fields need to be transmitted. Three additional fields may be used to denote which fields should be changed by the partial MV data. In the example, lab_xy generally denotes whether or not MVx/MVy should be changed and, if so, how, in accordance with the following:

0: This does not change the MVC block's MVx/MVy;

1: The partial MV replaces the MV after decomposition in the FI component 420. This kind of partial MV is usually for a block near an object boundary;

2: The partial MV changes the MV after post-processing 416; and

3: The partial MV will change the MV after MVC selection. This will generally cause the partial MV to impact the MV spatial recursive and, therefore, multiple blocks.

At the MVC recursive stage, use of the partial MV to change the wrong MV will generally allow the partial MV to be the spatial MV of the next row and allow the partial MV to spread to other blocks. This may be especially important for blocks that can't find a true MV, e.g., smaller objects with large motion or the background after a scene change.

At the final stage, the partial MVs typically change the final output MV after the MVC post-processing 416. This generally improves FI quality and improves MVC quality for the next frame.

The block size of the partial MV may be 16×16 pixels, 8×8 pixels, or even smaller, and the MVC block size may be 16×16 pixels or 8×8 pixels, for example. In certain embodiments, the block size of partial MVs are typically equal to or smaller than that of the MVC block size. In such embodiments, the block size of the FI is generally the same as that of the partial MV. If the block size of the partial MV is 8×8 and the block size of the MVC is 16×16, then an MV down sampling block 406 may be used to change the partial MV from 8×8 pixels to 16×16 pixels, and an MV decomposition block 422 of the FI block 420 may be used to decompose the MV from 16×16 pixels to 8×8 pixels. After MV decomposition in the FI block 420, the partial MV may be applied again to improve MV quality near an object boundary.

In certain embodiments, the partial MV may be generated offline at the server side.

Figure 5:
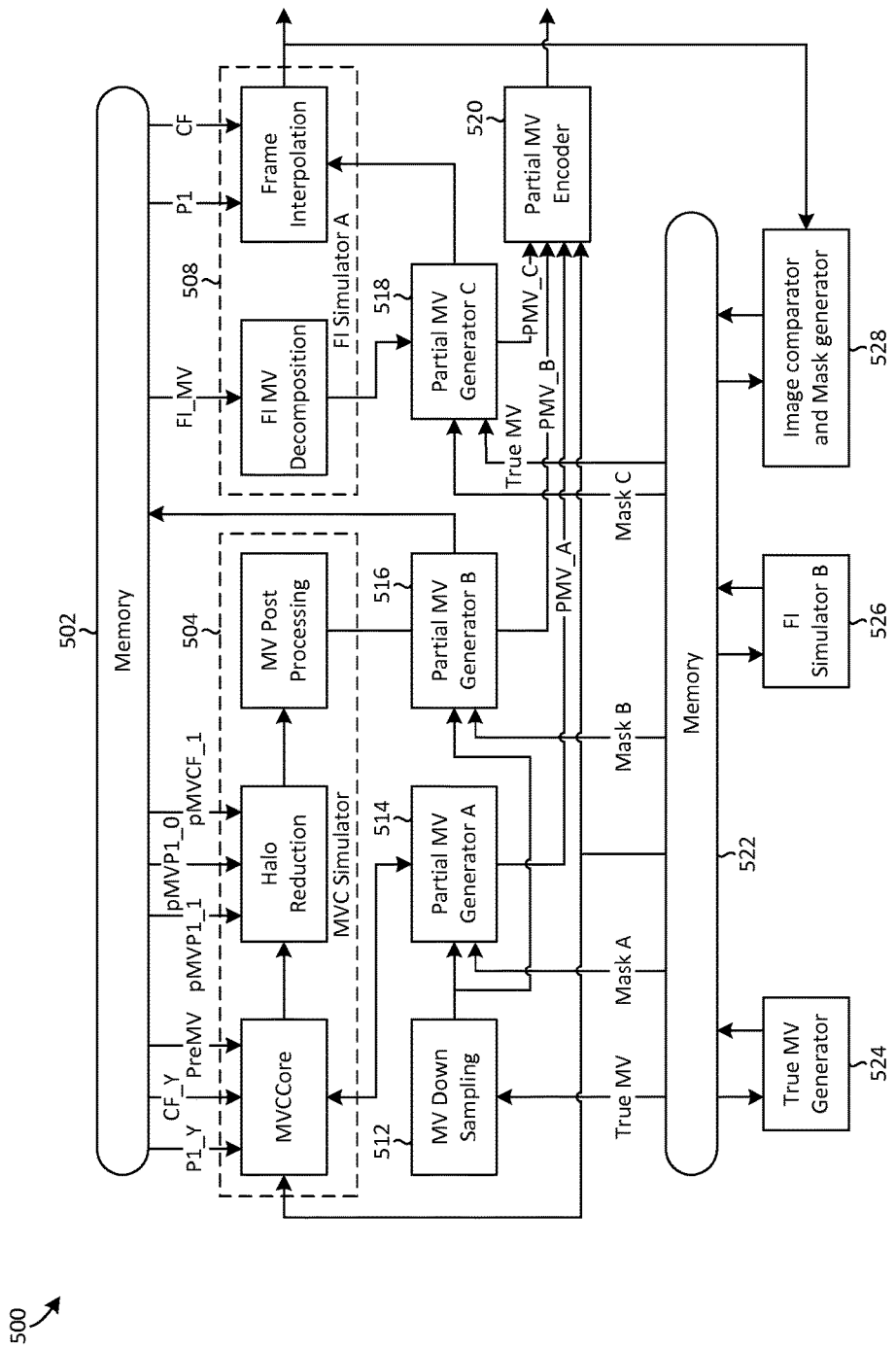
FIG. 5 illustrates an example of a system for partial MV generation in accordance with certain embodiments of the disclosed technology.

FIG. 5 illustrates an example of a system 500 for partial MV generation in accordance with certain embodiments of the disclosed technology. In the example, the system 500 includes two memories 502 and 522, an MVC simulator 504, two FI simulators 508 and 526, a true MV generator 524, and an image comparator and mask generator 528.

The MVC simulator 504 may be used to simulate the MVC block at the client side (e.g., a TV or mobile device). The MV block size of the MVC simulator 504 is generally the same as that of the MVC in the FRC client. If the MV block size in the FRC client is 8×8 pixels, for example, then the MV block size in the MVC simulator 504 would typically be 8×8 pixels. In certain embodiments, the MVC simulator 504 generally gets an initial MV for each block size of 16×16 pixels.

The first FI simulator (A) 508 may be used to simulate the FI block at the client side. The block size may be 8×8 pixels, for example. The output image quality is typically equal to that of the FRC client.

The true MV generator 524 is typically a very complex software implementation, and the MV may even be edited manually to make sure that the true MV can be determined for every block. In certain embodiments, the true MV generator 524 usually generates an MV for each 8×8 block. Besides the MV field, additional information may be generated such as global MV, global motion model, regional foreground/background MV, and regional brightness compensation value. Such information generally helps the client-side MVC perform better. The output of the true MV generator 524 may write to the second memory 522.

The second FI simulator (B) 526 may be used to generate a golden reference-interpolated image based on the true MV, and the output image will typically be written to the second memory 522.

The image comparator and mask generator 528 may be used to compare images from the first FI simulator (A) 508 and the second FI simulator (B) 526 and generate a block mask at 16×16 and 8×8 pixels, respectively. Firstly, the image comparator and mask generator 528 may compare two images at each block with 8×8 (and 16×16) pixels and, if the sum of the absolute pixel difference is larger than a particular threshold, set the mask value to 1 for this block; otherwise, the mask value may be set to 0. The mask may be used to limit partial MVs to blocks that are visually different, which is generally important for reducing partial MV size.

An MV down sampling block 512 may be used to ensure that the block size of the true MV matches that of the MVC simulator 504. In the example, the MV down sampling block 512 may down-sample the MV from 8×8 to 16×16 pixel blocks.

A first partial MV generator (A) 514 generally represents the first stages of the comparing block MV. If the MV difference is larger than a particular threshold and Mask A's value at the current block is 1, then the true MV may be used to overwrite the MVC simulator's 504 MV and the MV may also be sent to an MV encoder 520. The overwritten MV will generally also be the spatial MV of the next row in the MVC simulator 504. This will typically help the MVC's convergence so that fewer partial MV's are required. If MVx/MVy are changed at this stage, the partial MV's lab_xy flag will typically be set to 3. $K_{occ}$ and $K_{still}$ values will generally not be changed at this stage.

A second partial MV generator (B) 516 may be used such that the block MVs are again compared individually. If the MV difference is larger than a particular threshold which can be different than the threshold used in the first stage, and if the MV has not already be changed and Mask B's value at the current block is 1, then the true MV may be used to overwrite the MVC simulator's 504 MV and the MV may also be sent to the MV encoder 520. If MVx/MVy are changed at this stage, the partial MV's lab_xy may be set to 2. If $K_{occ}$ is changed at this stage, lab_$k_{occ}$ may be set to 1. If $K_{still}$ is changed at this stage, lab_$k_{still}$ may be set to 1.

A third partial MV generator (C) may be used when the block size of the MVC simulator 504 is different from the block size of the first FI simulator 508. Another MV block size conversion may be done between the MVC simulator 504 and first FI simulator 508 and compared with the true MV again. If the MV has not changed at the previous stages, and if the MV difference is larger than a particular threshold and Mask C's value at the current block is 1, then lab_xy may be set to 1. If the $K_{occ}$ value of the decomposed MV is different than that of the true MV and Mask C's value is 1, then lab_$k_{occ}$ may be set to 1. If the $K_{still}$ value of the decomposed MV is different than that of the true MV and Mask C's value is 1, set lab_$k_{still}$ may be set to 1.

The partial MV encoder 520 may be used to enable partial MVs from partial MV generators A 514, B 516, and C 518, and certain global and region information may also be encoded.

To avoid the generation of potentially useless MV, the partial MV generation system 500 may perform three rounds as follows:

A first round (Round A) may be used to generate Mask A for each block having 16×16 pixels. In this round, the MVC simulator 504, FI simulator A 508, true MV generator 524, and FI simulator B 526 may be enabled and the outputs of the FI simulator A 508 and FI simulator B 526 may be compared in the image comparator and mask generator 528 and the output Mask A may be written to the memory 522. The MVC simulator 504 and FI simulator A 508 will generally not be affected by the true MV and no partial MV will typically be generated at this round. The interpolated image of the FI simulator B 526 will generally be written to the memory 522 as the golden interpolated image.

A second round (Round B) may be used to generate a partial MV with the partial MV generator A 514. The MVC simulator 504, MV down sampling module 512, and partial MV generator A 514 may be enabled and then the partial MV generator A 514 may generate the partial MV (i.e., denoted by PMV_A) based on Mask A and MV difference between the true MV and the MVC simulator's 504 MV. The modified MV may be sent to the FI simulator A 508 and the interpolated image in the FI simulator A 508 may be compared with the golden interpolated image again. The image comparator and mask generator 528 may be used to generate Mask B and Mask C, for example, where Mask B is based on a block of 16×16 pixels, and Mask C is based on a block of 8×8 pixels.

A third round (Round C) may be used to generate a partial MV with the partial MV generators B 516 and C 518. The MVC simulator 504, FI simulator A 508, MV down sampling block 512, and Partial MV generators B 516 and C 518 may be enabled and the MVC simulator 504 may use PMV_A to perform an MV overwrite. The partial MV generator B 516 may generate PMV_B and partial MV generator C 518 may generate PMV_C. PMV_A, PMV_B and PMV_C may be encoded in the partial MV encoder 520.

In certain embodiments, other global/regional information concerning the MVC simulator 504 may be sent to the FRC client, e.g., to make the chip-side MVC duplicate that at the server side.

The following discussion is intended to provide a brief, general description of a suitable machine (e.g., projector system) in which embodiments of the disclosed technology can be implemented. Typically, the machine includes a system bus to which are attached processors, memory (e.g., random access memory (RAM), read-only memory (ROM), or other state preserving medium), storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal.

The machine may include embedded controllers, such as programmable or non-programmable logic devices or arrays, Application Specific Integrated Circuits (ASICs), embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

Embodiments of the disclosed technology may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other tangible storage devices and non-transitory storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the disclosed technology with reference to described embodiments, it will be recognized that the illustrated embodiments may be modified in arrangement and detail without departing from such principles. And although the foregoing discussion has focused on particular embodiments, other configurations are contemplated. In particular, even though expressions such as "according to an embodiment of the disclosed technology" or the like are used herein, these phrases are meant to generally reference embodiment possibilities, and are not intended to limit the invention to any particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A machine-implemented method of frame rate conversion (FRC), comprising:
    a motion vector (MV) generator at a client, the MV generator internally generating motion vectors (MVs);
    a frame interpolation (FI) block at the client, the FI block using the internally generated MVs to perform motion-compensated FI;
    an image comparator configured to compare a first frame from a first FI block at a server to a second frame from a second FI block at the server;
    an external MV generator externally generating MVs;
    the client receiving the externally generated MVs;
    replacing, at the client, at least a portion of the internally generated MVs with the externally generated MVs based on the comparing; and
    using the externally generated MVs in place of the internally generated MVs in subsequent iterations of a recursive three-dimensional (3D) motion vector calculation (MVC) process.

2. The machine-implemented method of FRC according to claim 1, further comprising inserting additional information into the externally generated MVs.

3. The machine-implemented method of FRC according to claim 2, wherein the additional information may include any of the following: global MV, global motion model, regional foreground/background MV, and regional brightness compensation value.

4. The machine-implemented method of FRC according to claim 1, further comprising packing the internally generated MVs into a compressed video stream.

5. The machine-implemented method of FRC according to claim 1, further comprising replacing at least some of the MVs used for H.264 compression with generated partial MVs.

6. The machine-implemented method of FRC according to claim 1, further comprising compressing the externally generated MVs.

7. The machine-implemented method of FRC according to claim 1, further comprising a partial MV packer performing MV compression to reduce the size of the partial MV.

8. The machine-implemented method of FRC according to claim 1, further comprising:
    decomposing the partial MVs; and
    applying the decomposed MVs to improve MV quality near an object boundary.

* * * * *